United States Patent
McMurtry

(10) Patent No.: US 7,810,248 B2
(45) Date of Patent: Oct. 12, 2010

(54) COORDINATE POSITIONING MACHINE

(75) Inventor: David Roberts McMurtry, Dursley (GB)

(73) Assignee: Renishaw PLC, Wotton-under-Edge (GB)

( * ) Notice: Subject to any disclaimer, the term of this patent is extended or adjusted under 35 U.S.C. 154(b) by 143 days.

(21) Appl. No.: 12/308,084

(22) PCT Filed: Jun. 11, 2007

(86) PCT No.: PCT/GB2007/002181

§ 371 (c)(1),
(2), (4) Date: Dec. 5, 2008

(87) PCT Pub. No.: WO2007/144603

PCT Pub. Date: Dec. 21, 2007

(65) Prior Publication Data

US 2010/0058602 A1 Mar. 11, 2010

(30) Foreign Application Priority Data

Jun. 16, 2006 (GB) .................................. 0611979.6

(51) Int. Cl.
*G01B 5/008* (2006.01)
(52) U.S. Cl. ....................................................... 33/503
(58) Field of Classification Search .................. 33/503, 33/556, 557, 558, 559, 560, 561
See application file for complete search history.

(56) References Cited

U.S. PATENT DOCUMENTS

| 5,388,935 | A | | 2/1995 | Sheldon |
| 5,604,593 | A | | 2/1997 | McMurtry |
| 5,909,939 | A | * | 6/1999 | Fugmann ...................... 33/503 |
| 6,021,579 | A | * | 2/2000 | Schimmels et al. ........... 33/556 |
| 7,040,033 | B2 | * | 5/2006 | Zhu et al. ...................... 33/556 |
| 7,386,408 | B2 | * | 6/2008 | Nishibashi et al. ............ 33/503 |
| 2009/0133276 | A1 | * | 5/2009 | Bailey .......................... 33/503 |
| 2009/0260243 | A1 | * | 10/2009 | Evans et al. ................... 33/503 |

FOREIGN PATENT DOCUMENTS

| DE | 199 44 569 CI | 5/2001 |
| EP | 0 692 088 B1 | 11/1999 |
| SU | 1222538 A | 4/1986 |
| WO | WO 90/07097 A1 | 6/1990 |

* cited by examiner

*Primary Examiner*—G. Bradley Bennett
(74) *Attorney, Agent, or Firm*—Oliff & Berridge, PLC

(57) ABSTRACT

A coordinate positioning apparatus has a base a structure and six struts joining the base and the structure. A working volume is defined by the base, structure and six struts. A support member extends from the supported structure. At least one access region is provided into the working volume, the access area being formed between two adjacent struts, the area of the access region being greater than the area between another set of adjacent struts. Access to the working volume is thereby improved.

22 Claims, 6 Drawing Sheets

COORDINATE POSITIONING MACHINE

This invention relates to machines in which two structures are connected by a plurality of members, and in which access is required to the space surrounded by the members. There may be movement between the two structures, for example in machines such as a coordinate measuring machine or a machine tool. Alternatively the two structures and plurality of members may have a rigid construction.

One well known type of coordinate positioning machine has a 'Cartesian' configuration, in which an operating module (which may incorporate a probe, for example) is supported for movement relative to a base (such as a table) with three translational degrees of freedom by means of three 'serially' mounted (i.e. one on top of another), mutually orthogonal linear guideways. This type of machine has the disadvantage that each guideway must support the one above it, which can result in bending due to gravitational forces. Furthermore, as driving motors are required for each level, large masses are associated with each guideway. This type of machine has the advantage of ease of access to the working volume of the machine.

In an alternative support configuration, an operating module is supported for movement relative to a base by a plurality of articulating linkages, each of which is connected directly between the operating module and a support member which forms part of the base. In such a 'parallel' mounting configuration the weight is equally distributed between the linkages, thus minimising bending due to weight.

European patent EP 0692088 discloses a machine for positioning an operator such as a tool or probe relative to a workpiece. As illustrated in FIG. 8, the machine has a first structure 2 to which an operator is mounted and a second structure 4. Six struts 6 connect the two structures via joints 8a-8f on the structures. Drive means are associated with the struts to adjust the length of the strut between the joints on the two structures and thereby produce relative movement between the structures. This type of parallel coordinate machine has the disadvantage that access to the internal volume of the machine (i.e. as defined by the first and second structures and the struts) is hampered by the struts.

The present invention provides a coordinate positioning apparatus comprising:
 a base;
 a structure;
 six or more struts joining the base and the structure;
 a working volume defined by the base, structure and struts;
 a support member on the structure, for mounting an operating module thereon;
 at least one access region into the working volume, the at least one access region being formed between two adjacent struts, the area of the access region being defined by two struts, a straight line between connection points of the struts to the base and a straight line between connection points of the struts to the structure;
 wherein the area of the at least one access region is greater than the area between another set of adjacent struts.

This arrangement improves the to the working volume of the machine.

The access region may be quadrilateral. The area between another set of adjacent struts may be substantially triangular.

A plurality of joints may be located at the base and the structure for joining the struts to the base and support structure. One or more struts may be connected to each joint. The joints enable relative rotational movement between the strut and one of the base or structure which is connected to the joint. The joints may comprise pivot joints, for example ball joints.

The configuration of the joints may be different at the base and structure.

In one embodiment, the geometric configuration of the joints in one of the base and structure is triangular and the geometric configuration of the joints in the other of the base and support structure is a quadrilateral. Preferably each joint in the triangle supports two struts, whereas two joints in the quadrilateral supports two struts and two other joints in the quadrilateral support single struts.

In another embodiment, there are six joints in the upper structure and six joints in the base, with each joint supporting a single strut.

The length of the strut between the joints in the structure and base may be adjustable, thereby enabling the structure to be movable relative to the base. The struts may be telescopic. Alternatively, the length of the struts may be fixed.

Two access regions may be provided, the access regions being arranged so a path extends between the two access regions through the working volume in a straight line.

The coordinate positioning machine may comprise a coordinate measuring machine.

The orientation of the operating module may be adjustable about at least one axis, e.g. about two or three axes.

The operating module may comprise a sensor or a probe assembly.

Embodiments of the invention will now be described in more detail, with reference to the accompanying drawings in which.

Figure 1:
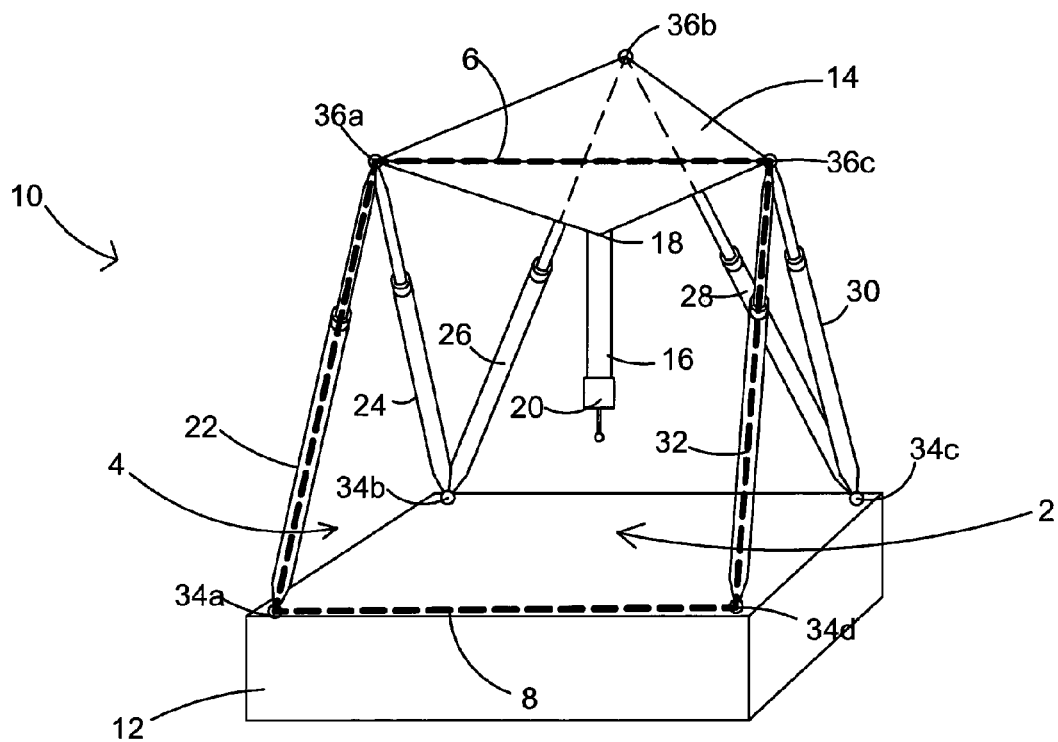
FIG. 1 is a perspective view of a first embodiment of the invention comprising a machine having four ball joints in the base and three ball joints in the upper structure.

A first embodiment of the invention is illustrated in FIG. 1. The machine 10 has a base 12 and an upper structure 14. The base 12 is rigid and may be made of granite, for example. The upper structure 14 is preferably lighter and may be made up of rigid rods connected together. In this embodiment rigid rods are connected together to form an inverted tetrahedron 15. The upper structure 14 supports a support member, for example an arm 16 from the apex 18 of the tetrahedral structure, which extends downwards towards the base. A measurement probe 20 or other operating module may be mounted on the arm. Although the term 'arm' is used, other commonly used terms for the support member include Z column and quill.

Six struts 22-32 connect the base 12 to the upper structure 14 and are mounted by pivot joints 34a-d, 36a-c which allow rotational movement. In this embodiment ball joints are used but other types of joint which provide rotational movement may also be used such as a universal joint, for example a Hook's joint. The struts 22-32 are telescopic and provided with a drive, so that by changing the lengths of the struts, the upper structure may be moved relative to the base. In moving the upper structure, the arm and measurement probe (or other operating module) mounted on it is also moved relative to the base. A measurement system, such as a scale and readhead associated with each strut, is used to determine the distance along each strut between the joints and thus the position of the upper structure relative to base and to thereby determine the position of the measurement probe.

In the embodiment illustrated in FIG. 1, the upper structure is provided with three ball joints 36a-c in a triangular configuration. The triangular configuration may comprise an equilateral triangle, but other forms of triangle may also be used. The base is provided with four ball joints 34a-d in a quadrilateral, for example square, configuration. The struts 22-32 are arranged with two struts connected to each ball joint 36a-c in the upper structure, two struts connected to two of the ball joints 34b,34c in the base and one strut connected to each of the two remaining ball joints 34a, 34d in the base. In this arrangement, an opening is created between the two struts 22,32 which have their own individual ball joints 34a,34b in the base 12. This space provides access to the interior of the machine, enabling parts to easily be placed on and removed from the base 12.

Although FIG. 1 illustrates that the four ball joints 34a-d on the base are in a square arrangement, other configurations of the ball joints on the base are possible. For example, the ball joints could be arranged in a trapezium, i.e. a quadrilateral with one pair of opposite sides parallel or a trapezoid, i.e. a quadrilateral with no parallel sides. However, if the base is square, the ball joints can advantageously be mounted towards the four corners of the base, thereby maximising the working area within the struts.

Figure 8:
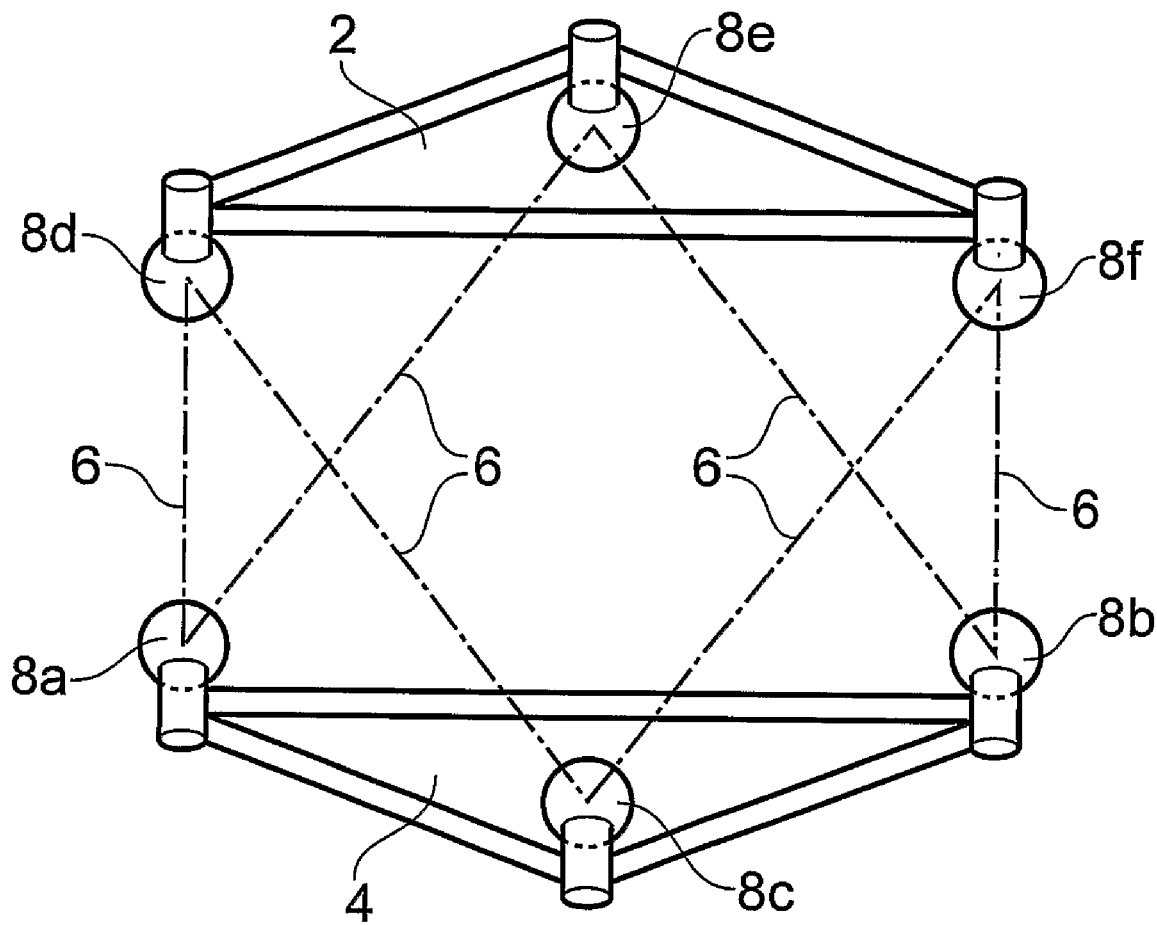
FIG. 8 is a perspective view of a prior art machine having three joints in the base and three joints in the upper structure.

This embodiment differs from that illustrated in FIG. 8 as the rotational symmetry of the struts has been disrupted to improve the access to the internal volume. This internal or working volume 2 is define by the base, upper structure and struts. In this embodiment, this has been achieved by replacing a single joint (see ball joint 8c in FIG. 8) by a pair of joints 34a,34d which are spaced apart. Thus a triangular area between two struts and the base has been replaced by a quadrilateral area between the two struts, base and upper structure. In this embodiment the two struts are substantially parallel to one another. Thus by increasing the area between a pair of adjacent struts, compared to other pairs of adjacent struts, access has been improved. In this manner, projected access into the working volume has been created. As can be seen in FIG. 1, the area of the access region 4, defined by the two struts 22,32, a straight line 8 between the connection points of the struts at the base and a straight line 6 between the connection points of the struts at the upper structure is larger than the area between other pairs of adjacent struts.

As can be seen, the sum of the distance between the joints 36a,36c connecting two struts 22,32 to the upper structure 14 and the distance between the joints 34a,34d connecting said two struts 22,32 to the base 12 is greater than the corresponding value for another pair of struts.

The embodiment illustrated in FIG. 8 has high stiffness due to the rotational symmetry of the struts. By disrupting this symmetry to improve access, the stiffness of the system is reduced but is still adequate.

Figure 2:
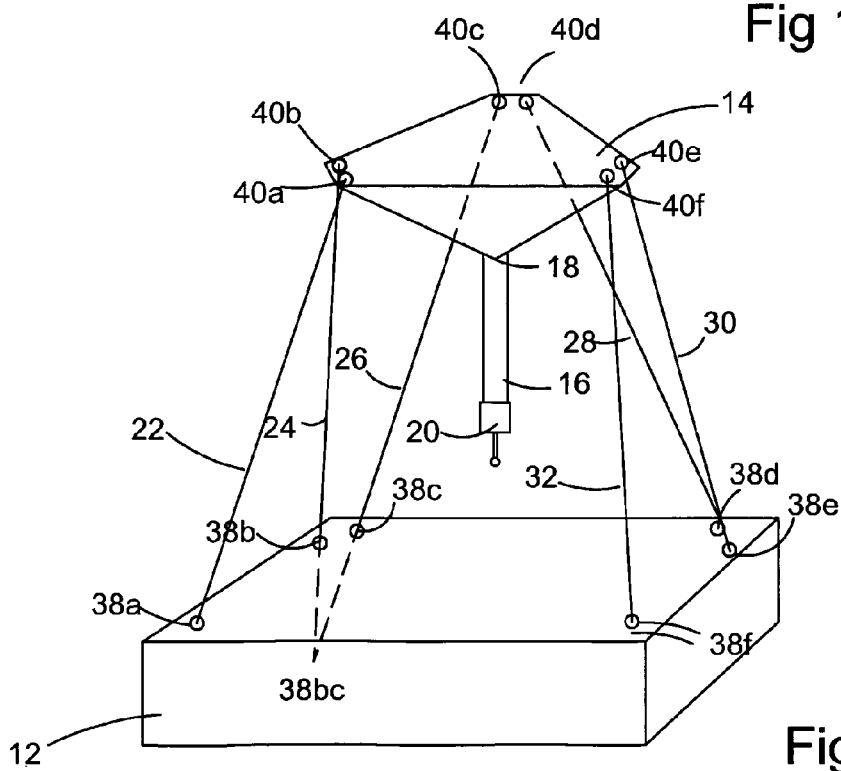
FIG. 2 is a perspective view of a second embodiment of the invention comprising a machine having six ball joints in the base and six ball joints in the upper structure.

A second embodiment of the invention is illustrated in FIG. 2. In this embodiment, both the upper structure 14 and base 12 are provided with six ball joints 38a-f, 40a-f, with each strut 22-32 being connected to an individual ball joint at each end. Thus, in place of a common ball joint, as illustrated in FIG. 1, a pair of ball joints for a pair of struts is now used. The pairs of ball joints are arranged such that vectors along the struts intersect. In FIG. 2, 38bc is the point of intersection of vectors along struts 24 and 26. Thus FIG. 2 shows three pairs of ball joints 40a and b, 40c and d, 40 e and f arranged in a triangle in the upper structure 14. The base is provided with two pairs of ball joints 38b and c, 38d and e and two individual ball joints 38a,38f, arranged in a quadrilateral, such as a square (or other configuration as described in more detail with reference to FIG. 1).

This arrangement has the same effect as the arrangement illustrated in FIG. 1.

Figure 3:
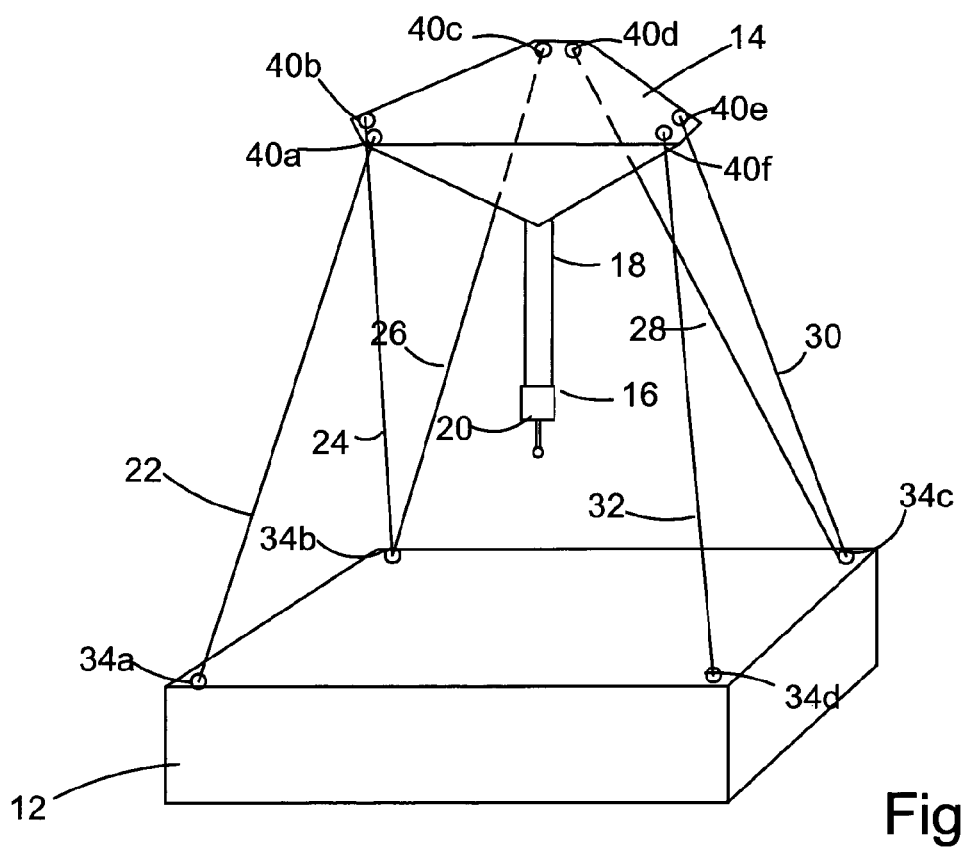
FIG. 3 is a perspective view of a third embodiment of the invention comprising a machine having four ball joints in the base and six ball joints in the upper structure.

FIG. 3 illustrates a third embodiment of the invention. In this embodiment, the ball joints 40a-40f in the upper structure 14 are in groups as in the embodiment of FIG. 2, whilst the ball joints 34a-34d on the base 12 are not in groups, as in the embodiment of FIG. 1. Of course, the inverse arrangement of this could be used, i.e. the upper structure may be arranged as in FIG. 1 and the base may be arranged as in FIG. 2.

Figure 4:
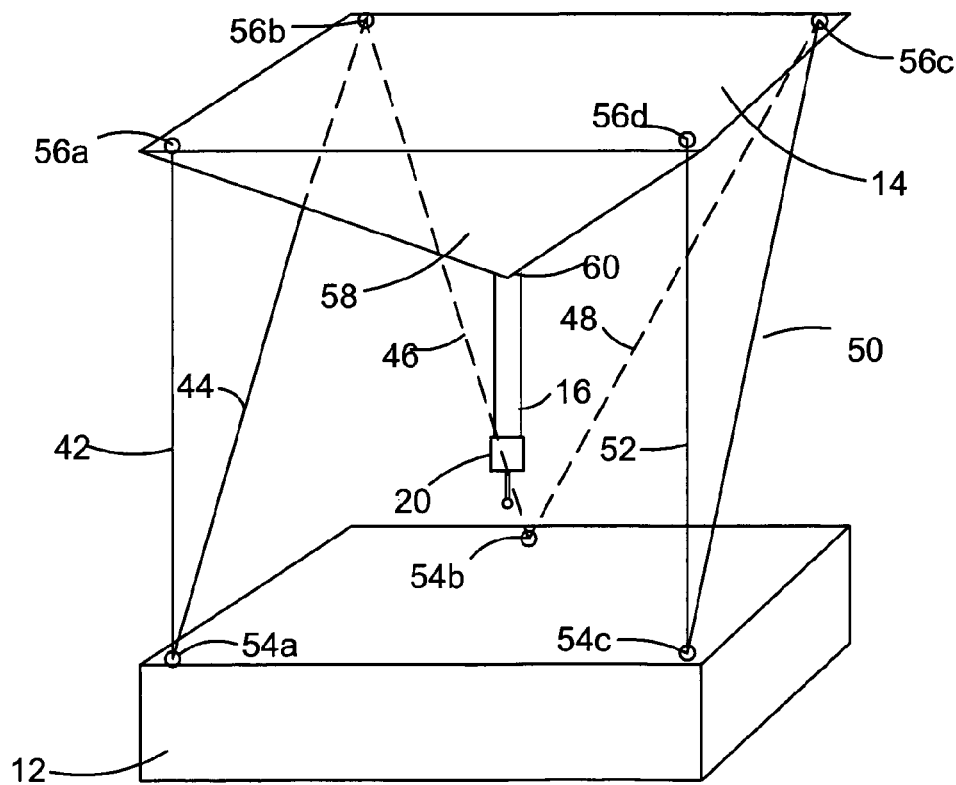
FIG. 4 is a perspective view of a fourth embodiment of the invention comprising a machine having three ball joints in the base and four ball joints in the upper structure.

A fourth embodiment of the invention is illustrated in FIG. 4. This embodiment is an inverse arrangement of the arrangement illustrated in FIG. 1. In this arrangement the upper structure 14 has an inverted pyramid configuration 58, having a square upper surface 59 and an apex 60 from which the arm 16 extends.

In FIG. 4, there are four ball joints 56a-56d provided towards the corners of the upper surface 59 of the pyramid and three ball joints 54a-c on the base 12. As in previous embodiment, struts 42-52 extend between the upper structure 14 and the base 12, connected at each end via a ball joint 54a-c, 56a-d to the base 12 and upper structure 14, respectively.

At the base 12, two struts are connected to each of the ball joints 54a-c. At the upper structure 14, two of the ball joints 56b,56c each have two struts connected.

The other two ball joints 56a,56d each have only one strut connected to each of them. As in previous embodiments, this arrangement creates an opening between the two struts 42,52 which have their own individual ball joints 56a,56d in the upper structure 14, thereby providing ease of access to the interior of the machine.

Figure 5:
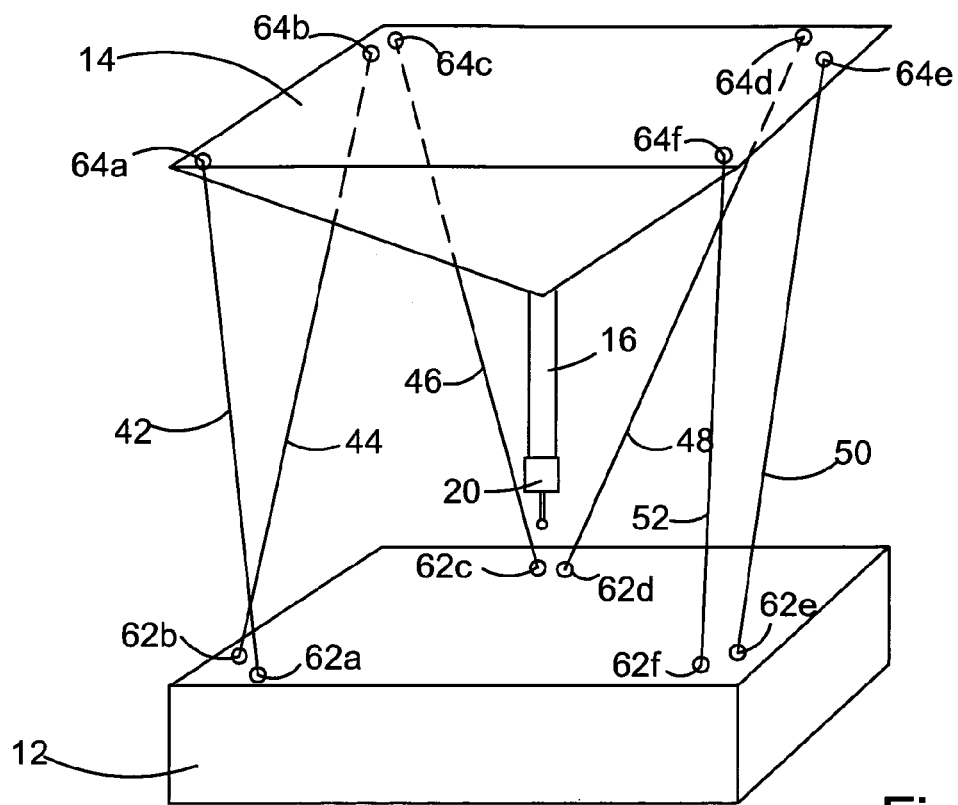
FIG. 5 is a perspective view of a fifth embodiment of the invention comprising a machine having six ball joints in the base and six ball joints in the upper structure.

FIG. 5 illustrates a fifth embodiment of the invention. This is a variation of the fourth embodiment which includes some of the features of the second embodiment.

As illustrated in FIG. 5, both the upper structure 14 and base 12 are provided with six ball joints 62a-f,64a-f, with each strut being connected to an individual ball joint at each end. In place of a common ball joint, as illustrated in FIG. 4, a pair of ball joints is now used. As described with reference to FIG. 2, these are arranged such that the vectors along the struts intersect. This arrangement has the same effect as the arrangement illustrated in FIG. 4.

It is also possible to have a combination of the embodiments disclosed in FIGS. 4 and 5. For example, there may be four ball joints at the top and six at the bottom (forming three groups of two). Alternatively, there may be six ball joints at the top (forming two groups of two and two groups of one) and three ball joints at the bottom.

Figure 6:
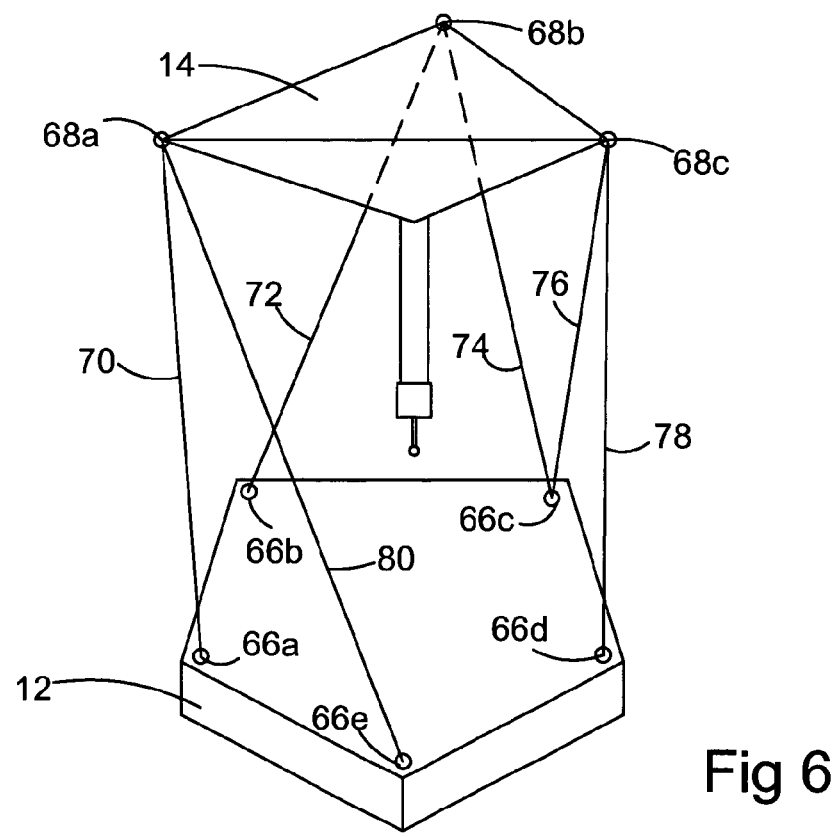
FIG. 6 is a perspective view of a sixth embodiment of the invention comprising a machine having five ball joints in the base and three ball joints in the upper structure.

FIG. 6 shows a sixth embodiment of the invention in which there are five joints 66a-e in the base and three joints 68a-c in the upper structure 14. Each of the joints 68a-c in the upper structure 14 has two struts 70-80 connected whilst one joint 66c in the base has two struts 74,76 connected and four joints 66a,66b,66d,66e have one strut 70,72,78,80 connected. This arrangement has two areas of improved access (between struts 70 and 72 and between struts 78 and 80) which allows a part to be inserted into the internal volume from one side and removed from the internal volume from the other side.

Figure 9:
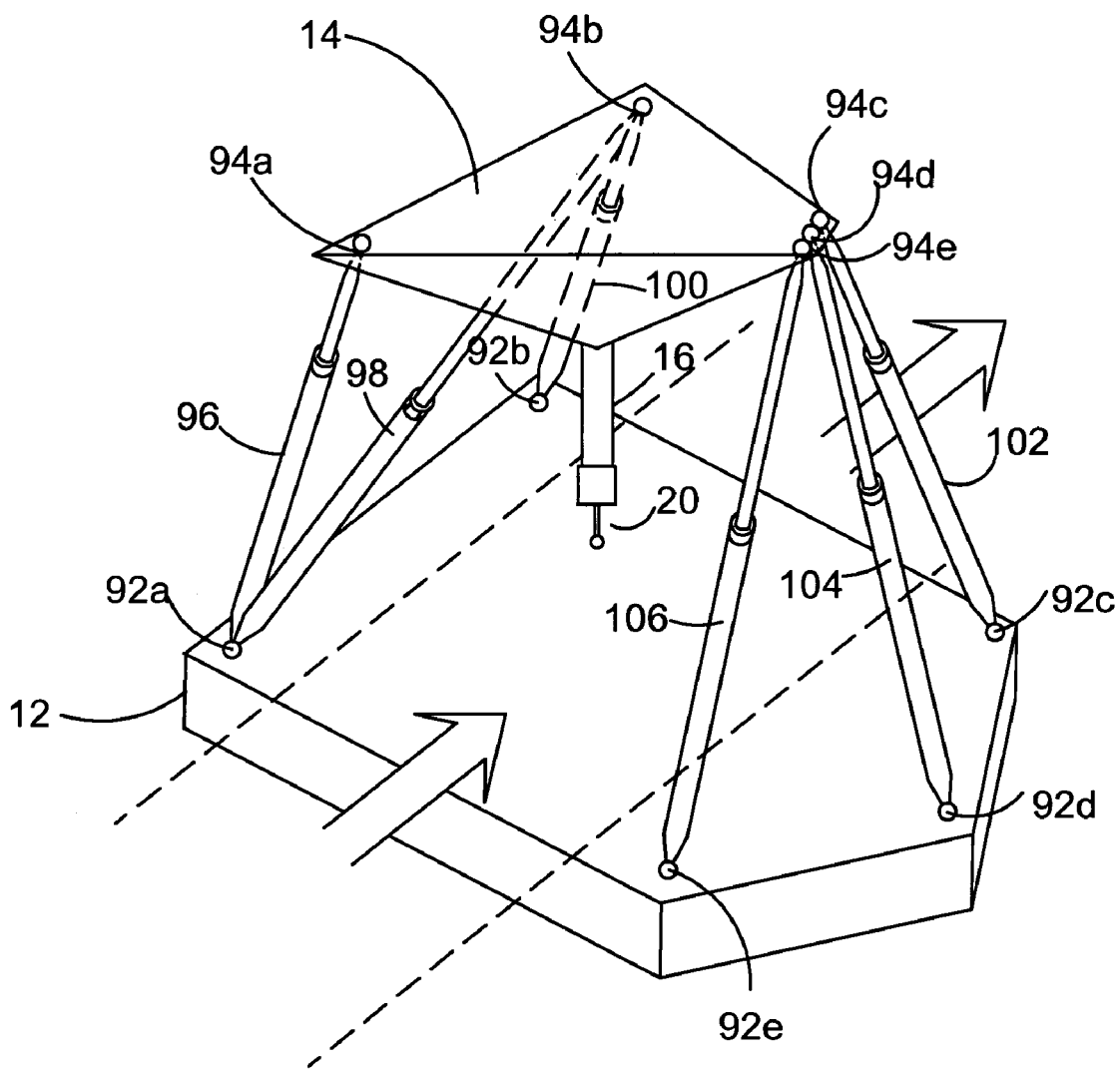
FIG. 9 is a perspective view of a seventh embodiment of the invention comprising a machine having five ball joints in the base and five ball joints in the upper structure.

FIG. 9 shows a seventh embodiment of the invention in which there are five joints 92a-92e in the base 12 and five joints 94a-94e in the upper structure 14.

The arrangement of joints in the upper structure is such that joint 94a has one strut 96 connected, joint 94b has two struts 98,100 connected and each of joints 94c-e have one strut 102,104,106 connected. The joints are in a triangular configuration, with joint 92a in one corner, joint 92b in a second corner and joints 92c-e in a third corner.

The arrangement of joints in the base is such that joint 92a has two struts 96,98 connected and each of joints 92b-92e have one strut connected 100-106. The joints are in a pentagonal configuration, with one joint in each corner.

As illustrated in FIG. 9, this arrangement has two areas of improved access (between struts 96 and 106 and between struts 100 and 102). As in the arrangement of FIG. 6, this allows a part to be inserted into the internal volume from one side and removed from the internal volume from the other side, as illustrated by the arrow. The embodiment of FIG. 9 has the advantage that the two access areas are opposite one another, allowing ease of movement of the part in and out of the internal volume. This arrangement allows an object to be moved in a straight line between access regions through the working volume.

Variations of these embodiments are possible with between three and six joints. For example ball joints 94-c,d & f may be combined to form a single ball joint or two ball joints with one strut connected to one ball joint and two struts connected to a second ball joint.

The embodiments illustrated in FIGS. 1-6 and 9 all illustrate the struts being mounted at each end to ball joints. In FIG. 2-8 the struts are shown by lines, for ease of illustration. These struts may be telescopic struts as illustrated in FIGS. 1 and 9. Alternatively, as disclosed in U.S. Pat. No. 5,604,593, the struts may comprise rigid ram members and the joints comprise spherical bearings having a universally rotatable ball with a bore extending therethrough in which the tubular ram member can slide telescopically by means of a friction drive. Thus the ram member is driven to slide through the spherical bearing to adjust the length of the ram member between the joints on the base and upper structure.

Figure 7:
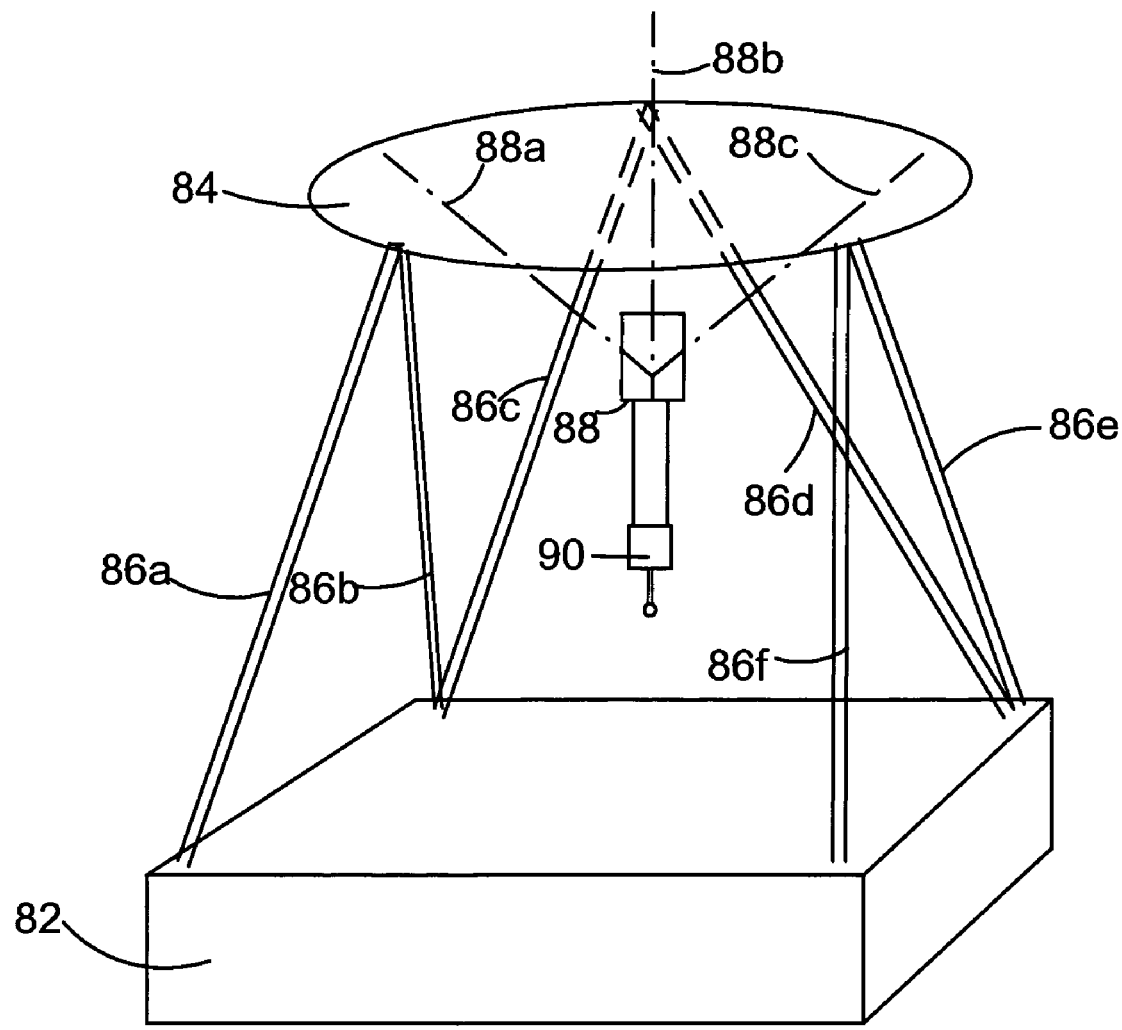
FIG. 7 is a perspective view of an alternative arrangement in which the struts are static.

This arrangement of struts is also suitable for a static system. FIG. 7 illustrates an alternative arrangement of a machine. In this arrangement, the base 82 and upper structure 84 are in a fixed position relative to one another and the six struts 86a-f are used to support the fixed upper structure 84 relative to the base 82. A mechanism 88 for supporting a measurement device 90 is mounted to the upper structure 84, such that is moveable relative to the fixed structure. For example, powered linkages 88a,b,c may be provided to link the fixed upper structure 84 with the measurement device 90. As in the previous embodiments, the six struts 86 are mounted to enable access to the volume inside the struts.

This invention provides a rigid or six degree of freedom platform with at least one direction of projected access into the internal working volume.

Although all the embodiments illustrate six struts, additional struts may be provided between the base and upper structure.

Although the above embodiments describe a coordinate measuring machine, this invention is suitable for other applications. For example, the machine may comprise a coordinate positioning machine in which a part is mounted in the internal volume and operated on by an operating module which is movable in six degrees of freedom. Such applications include coordinate measuring machines (CMMs), machine tools, rapid prototyping, material deposition/removal, printing, visual inspection, part manipulation and assembly and surface categorisation.

The operating module may comprise a sensor, such as a camera or temperature sensor. Alternatively, the operating module may comprise a probe assembly. The term probe assembly includes contact measurement probes, such as touch trigger probes which take discrete measurement points of a surface or scanning probes which measure the amount of deflection of a stylus and can be used to scan a surface. A probe assembly also includes non contact probes, such as optical, capacitance or inductance probes. A probe assembly may also include a device such as a probe head which provides rotation of a probe mounted thereon about one or more axes. For example, WO90/07097 discloses a motorised scanning head which enables a stylus mounted on the motorised scanning head to be rotated about two orthogonal axes. The probe or sensor may also be rotated about its own axis. Likewise, operating modules other than probe assemblies may also be rotated about one or more axis.

The invention claimed is:

1. A coordinate positioning apparatus comprising:
a base;
a structure;
six or more struts joining the base and the structure;
a working volume defined by the base, structure and struts;
a support member on the structure, for mounting an operating module thereon;
at least one access region into the working volume, the at least one access region being formed between two adjacent struts, the area of the access region being defined by two struts, and a straight line between connection points of the struts to the base and a straight line between connection points of the struts to the structure;
wherein the area of the at least one access region is greater than the area between another set of adjacent struts.

2. A coordinate positioning apparatus according to claim 1 wherein the access area is quadrilateral.

3. A coordinate positioning apparatus according to claim 2 wherein the area between another set of adjacent struts, the base and structure is substantially triangular.

4. A coordinate positioning apparatus according to claim 1 in which a plurality of joints are located at the base and structure for joining the struts to the base and structure.

5. A coordinate positioning apparatus according to claim 1 wherein one or more struts are connected to each joint.

6. A coordinate positioning apparatus according to claim 4 wherein the joints enable relative rotational movement between the strut and one of the base or structure which is connected to the joint.

7. A coordinate positioning apparatus according to claim 4 wherein the joints comprise pivot joints.

8. A coordinate positioning apparatus according to claim 4 wherein the configuration of the joints is different at the base and structure.

9. A coordinate positioning apparatus according to claim 4 wherein the geometric configuration of the joints in one of the base and structure is a triangle and the geometric configuration of the joints in the other of the base and structure is a quadrilateral.

10. A coordinate positioning apparatus according to claim 9 wherein each joint in the triangle supports two struts, whereas two joints in the quadrilateral supports two struts and two other joints in the quadrilateral support single struts.

11. A coordinate positioning apparatus according to claim 4 wherein there are six joints in the upper structure and six joints in the base, with each joint supporting a single strut.

12. A coordinate positioning apparatus according to claim 4 wherein the length of the strut between the joints in the structure and base may be adjustable, thereby enabling the structure to be movable relative to the base.

13. A coordinate positioning apparatus according to claim 1 wherein the struts are telescopic.

14. A coordinate positioning apparatus according to claim 1 wherein the length of the struts is fixed.

15. A coordinate positioning apparatus according to claim 1 wherein the at least one access region comprises two access regions.

16. A coordinate positioning apparatus according to claim 1 where two access regions are provided, the access regions being arranged so a path extends between the two access regions through the working volume in a straight line.

17. A coordinate positioning apparatus according to claim 1 wherein the coordinate positioning apparatus comprises a coordinate measuring machine.

18. A coordinate positioning apparatus according to claim 1 wherein the orientation of the operating module is adjustable about at least one axis.

19. A coordinate positioning apparatus according to claim 1 wherein the orientation of the operating module is adjustable about two axes.

20. A coordinate positioning apparatus according to claim 1 wherein the orientation of the operating module is adjustable about three axes.

21. A coordinate positioning apparatus according to claim 1 wherein the operating module is a sensor.

22. A coordinate positioning apparatus according to claim 1 wherein the operating module is a probe assembly.

* * * * *